United States Patent [19]
Pruit

[11] Patent Number: 5,127,693
[45] Date of Patent: Jul. 7, 1992

[54] PORTABLE LIFTING DEVICE

[76] Inventor: John D. Pruit, 3009 Glen Hollow Cir., Carrollton, Tex. 75007

[21] Appl. No.: 681,090

[22] Filed: Apr. 5, 1991

[51] Int. Cl.⁵ .............................................. B65G 7/12
[52] U.S. Cl. ........................................ 294/15; 294/26
[58] Field of Search ............................ 294/11, 15–17, 294/19.1, 34, 26, 62, 92, 103.1, 137, 164, 165, 167–169; 254/2 R, 131, 133 R

[56] References Cited

U.S. PATENT DOCUMENTS

| | | | |
|---|---|---|---|
| 481,986 | 9/1892 | Waldron | 294/34 |
| 488,357 | 12/1892 | Hill | 294/26 |
| 705,277 | 7/1902 | McDowell | 294/62 |
| 1,302,461 | 4/1919 | Adamson | 294/15 |
| 1,374,372 | 4/1921 | Freund | 294/15 |
| 1,855,678 | 4/1932 | Jensen | 294/26 |
| 1,973,269 | 9/1934 | Russell | 294/34 |
| 2,178,738 | 11/1939 | Chenette | 294/15 |
| 2,428,941 | 10/1947 | Packard | 294/15 X |
| 2,430,142 | 11/1947 | Roberts | 294/26 X |
| 2,579,826 | 12/1951 | Ingram et al. | 294/15 |
| 2,665,162 | 1/1954 | Moore et al. | 294/16 |
| 2,823,010 | 2/1958 | Baxendell | 254/2 |
| 4,055,364 | 10/1977 | Breite | 294/16 |
| 4,098,442 | 7/1978 | Moore | 294/26 X |
| 4,113,160 | 9/1978 | Spiers | 294/15 X |
| 4,190,278 | 2/1980 | Jancik | 294/26 |

FOREIGN PATENT DOCUMENTS

| 319153 | 4/1919 | Fed. Rep. of Germany | 294/15 |
|---|---|---|---|
| 2171352 | 8/1986 | United Kingdom | 294/15 |

Primary Examiner—Johnny D. Cherry
Attorney, Agent, or Firm—Hubbard, Thurman, Tucker & Harris

[57] ABSTRACT

The invention pertains to a lightweight portable lifting device with an adjustable handle which is leveraged to tighten against a lifting bar at an easily adjustable variable distance from a support surface and is usable in pairs to lift and move objects, such as furniture. The handle and lifting bar have interlocking engagement teeth which are quickly and easily disengageable to permit positioning the handle member at a multiplicity of locations along the lifting bar. In a preferred embodiment, the handle is engageable and disengageable from the lifting bar simply by pivoting the handle between the lifting and a release position.

25 Claims, 3 Drawing Sheets

PORTABLE LIFTING DEVICE

BACKGROUND OF THE INVENTION

1. Field Of The Invention

The invention is in the field of manual lifting devices for use in lifting and carrying bulky objects from one location to another location with ease and which is adaptable to lift objects of varying size or shape.

2. Description Of The Prior Art

The prior art discloses a number of specialized lifting devices to help in carrying objects having a particular shape or configuration. There are specialized lifting devices for carrying objects such as sheets of plywood, barrels, concrete blocks or panes of glass. Such lifting devices are necessarily specially designed and configured to interact with the object to be carried. They have no universal applicability to a variety of objects to be picked up and moved to a different location in homes and businesses.

The most typically shaped object to be moved are objects having a three dimensional rectangular shape. Typical examples of such objects are desk and filing cabinets, book shelves, TV sets, washers, dryers, microwave ovens, refrigerators, freezers and many other objects of common usage. Sometimes such objects have to be picked up and moved for cleaning or repair purposes.

The problem faced by the non-professional mover is that he lacks the specialized equipment which is available to professional movers and cannot justify purchasing such equipment for occasional use. The problem faced in moving such objects is that there is either no place to get a handhold with which to apply lifting force to these relatively heavy objects, or the place where a handhold can be obtained is at an inconvenient lifting height. An example of this would be the top surface of a desk which extends over the pedestals. While the top provides a convenient place to lift, the arms must be bent in order to raise the object from the floor in a standing position. The person attempting to move such an object must rely on the arm muscles while the powerful leg muscles remain only peripherally involved. Alternately, the person attempting to move such an object must bend clear down to the floor in attempt to grasp the bottom of the object, such as a washer or dryer, which is impossible to accomplish without bending the back in an awkward, uncomfortable and even dangerous lifting position. Of course a movers dolly solves the problem nicely but is most usually not available.

The invention is a lightweight portable lifting device which is instantly adjustable to an almost infinite multiplicity of positions above the floor. The device has a support shelf on the bottom connected to a vertically oriented lifting bar having a leveraged handle extending oppositely from the support shelf and quickly and easily adjustable at the proper height. Since most of the common objects to be lifted have a flat bottom surface, a conveniently located handhold is obtainable simply by slipping the support shelf under a side of the object to be lifted and moving the handle member to the most comfortable lifting position which permits use of the powerful leg muscles while the back is straight and the arm extended. Another of the devices is used by another person on an opposite side of the object to be lifted, or in some cases four people and four of the devices can be used for very large or heavy objects.

SUMMARY OF THE INVENTION

A light weight portable lifting device is provided which is easily carried and employed along the sides of an object to be lifted and carried to provide a conveniently located handhold for lifting, having a handgrip which is quickly and easily movable to a correct lifting height. The lifting device has an elongate lifting bar having an upper end and load supporting lower end, having means for engagement extending along a side surface of the bar substantially between the ends. The device further includes a handle body having a handgrip portion and a bar receiving portion, the handgrip portion having means for engagement for lifting which is engageable at a multiplicity of positions with the means for engagement extending along the surface of the elongate lifting bar. The means for engagement of the bar receiving portion of the handle body is releasable and reengageable for lifting at different ones of said multiplicity of positions to move the handle body to comfortable and convenient lifting position of the handgrip when the load supporting lower end of the bar is provided with a lifting support means which is engaged under a lower surface of the object to be lifted.

The load supporting means attached to the lower end of the lifting bar may include a light weight support surface and a cushioning means to prevent damage where the device contacts an object to be lifted. The support means can be a right angled extension of the vertical lifting bar which may be provided with a support surface and stabilizing ports connected to a lower portion of the support bar.

In one embodiment, the handle body has a handgrip with an opening for the fingers and side portions which extend away from the handgrip and are connected to form a lifting bar receiving portion of the handle body. In a vertical orientation, the lifting bar would be seen as having a means for engagement comprising a series of downwardly facing teeth along its side surface, and at the bottom, a support surface extending oppositely away from the handle body when the bar is located for use in the bar receiving portion of the handle body.

In one embodiment, the bar receiving portion is an opening with surrounding sides having an abutment means and an oppositely located means for engagement which are separated on opposite sides of the lifting bar when the lifting bar is positioned in the bar receiving position of the handle body. The lifting bar has an abutment surface extending along its length between the ends on a side surface opposite the surface of the lifting bar having the means for engagement. The abutment means on the bar receiving portion of the handle body cooperates with the abutment surface of the lifting bar at any one of the multiplicity of positions of the handle with respect to the length of the bar, in combination with the means for engagement of the handle body and the lifting bar, to firmly grip and secure the handle body to the lifting bar when lifting force is applied to the handgrip.

The means for engagement of the handle body and lifting bar are preferably cooperating teeth which can interengage to permit lifting by means of the handgrip without movement of the handle body along the length of the lifting bar in the lifting direction. The bar receiving portion of the handle body is leveraged by the handgrip and is positionable between a lifting position in which the handle member is essentially horizontally oriented with the lifting bar vertical and a release position wherein the handle body is pivotally angled downwardly with respect to the horizontal portion. The bar receiving portion has an angled abutment means engageable with the lifting surface of the lifting bar and with respective engagement means of the handle body and lifting bar engaged in the lifting position. Upon pivoting the handle body, the angled abutment of the bar receiving opening is tilted to lie adjacent the abutment surface of the lifting bar and at the same time the engagement means of the handle body and the lifting bar are moved away from each other and automatically disengaged. Thus, a simple pivoting movement of the handle body permits the handle body to be moved upwardly or downwardly along the vertically extending lifting bar.

In another embodiment, the bar receiving portion has an abutment surface which is not angled and oppositely located therefrom. A pivoting member is attached to the bar receiving portion of the handle body and pivotable with respect to the handle body with the lifting bar positioned in the bar receiving portion. The pivoting member pivots to a lifting position, with the means for engagement of the pivoting member and the lifting bar interengaged. A release position is achieved by pivoting the pivoting member to disengage the respective means for engagement, preferably interengaging downwardly and oppositely upwardly angled teeth, to permit the handle body to be slid up and down the length of the lifting bar. This pivoting member is preferably a pawl member which is pivotable having teeth which are engageable with a corresponding multiplicity of teeth on a side surface of the lifting bar. The pawl may be spring loaded or pivoted to fall by gravity against the engagement means of the lifting bar. In either case the lifting force on the handgrip is transferred to the interengaging teeth and there is a jamming action which occurs between the abutment surface and the abutment means of the handle body to bind and secure the handle body against the lifting bar so that it cannot slip when lifting force is applied to the handgrip. Yet it is easily adjusted by release of the pawl and movement of the handle body to a comfortable lifting height on the lifting bar.

It is contemplated that the entire device can be fabricated from structural plastic which is economical to mold and yet provides strength with light weight so that the devices can be manufactured and sold at a reasonable price for home use. It may be desirable to angle the supporting surface at the bottom of the lifting bar upwardly so as to compensate for any bending of the lifting bar which may occur when lifting particularly heavy objects. The handle body is equipped with cushioning means which rest against a vertical surface of the object to be lifted to prevent scratching and marring.

DETAILED DESCRIPTION

In the description which follows various parts will be referred to by reference numbers in the various Figures which will be used for like elements insofar as possible.

Figures 1, 2, 3:
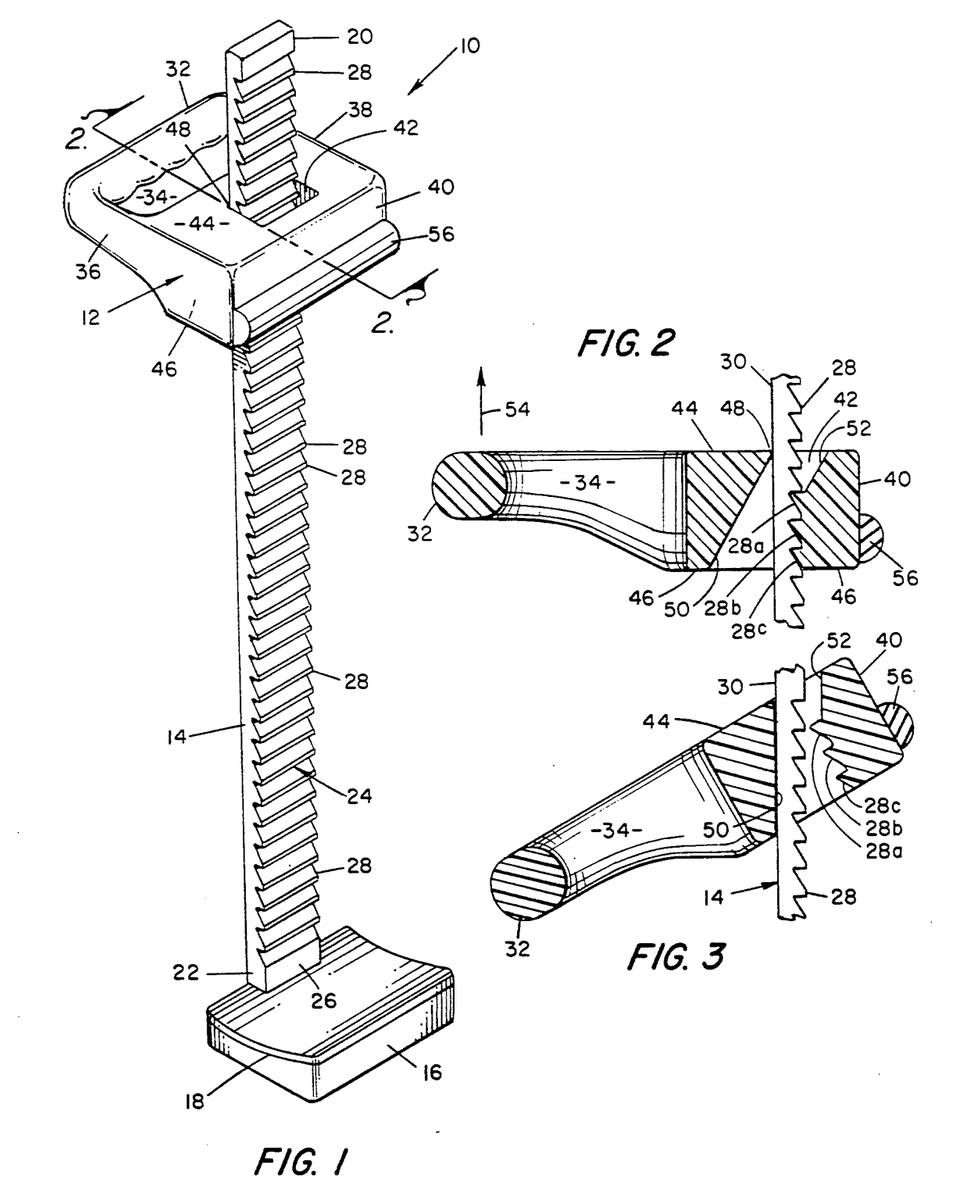
FIG. 1 is a perspective view of a preferred embodiment.
FIG. 2 is a cutaway elevation along line 2—2 of FIG. 1 of the handle body and a portion of the bar in gripping position.
FIG. 3 is a cutaway elevation of the handle member and a portion of the bar with the handle member pivoted to a release position.

Referring now to FIG. 1, a portable lifting device will be referred to generally by the reference numeral 10. The device includes a handle body 12 and an elongate lifting bar 14. A support means 16 is fixed to one end of lifting bar 14 and includes a cushioning layer 18. Support means 16 may have a curved surface to better accommodate the under surface of an object and to allow for some bending of the bar 14 when heavy lifting force is applied to the handle body 12.

The bar 14 has an upper end portion 20 and a lower end portion 22. End 22 is a load supporting lower end to which is fixed the support means 16, which may be a small platform.

Extending between end portions 20, 22 of bar 14 is a side surface 26 which has a means for engagement 24 preferably comprising a multiplicity of downwardly sloping teeth 28 extending along the side surface 26. Opposite the side surface 26 is an abutment surface 30 running longitudinally between the ends 20, 22 of bar 14. Abutment surface 30 may be a smooth surface without any teeth.

Handle body 12 has a handgrip portion 32 with a hand opening 34 and opposed side portions 36, 38 which together with the handgrip 32 and the front portion of the handle body form the opening 34. Side portions 36 and 38 continue away from the handgrip portion 32 to form a front portion 40 of handle body 12. Between the opening 34 and the front portion 40, the handle body has a bar receiving portion 42 which is open from an upper surface 44 through the front portion of the handle body to a lower surface 46 of the front portion of handle body 12. The opening of the bar receiving portion 42 is sized to accept the passage therethrough of the elongate lifting bar 14.

Better seen in FIGS. 2 and 3, bar receiving portion 42 has a laterally extending abutment means 48 which runs essentially the full width of the bar receiving opening 42 and acts as a fulcrum between the handle body 12 and the bar 14. Opening 42 is slightly wider than the width of the bar 14. Angled downwardly from abutment means 48 between surfaces 44, 46 on the front, bar receiving portion of the handle body, is an angled surface 50 on the backside of the bar receiving portion 42. Opposite and essentially parallel to angled surface 50 in the front portion of the bar receiving portion 42, is an angled surface 52 which provides relief in the bar receiving opening when the handle body is pivoted from the position of FIG. 2 to the position of FIG. 3. Surface 52 is angled from upper surface 44 and ends at a plurality of upwardly facing teeth 28a-c which are spaced and sized to interengage with any three downwardly facing adjoining teeth 28 of bar 14. The interengagement of the teeth is shown in FIG. 2.

The lifting direction is indicated by the arrow 54. It can be seen that when lifting force is applied in the direction of arrow 54 to the handgrip 32, abutment means or fulcrum 48 is in contact with abutment surface 30 on one side of bar 14. The teeth 28a-c form a means for engagement on the bar receiving portion of the handle body which interengage any set of corresponding adjacent teeth 28 which serve as the means for engagement 24 on the bar 14. Then if the support means 16 is placed under a side edge of an object and lifting force applied through handgrip 32, the bar receiving portion 42 through the abutment means 48 on one side and the engaged teeth 28a-c on the other side securely grip and secure the lifting bar which cannot slip or move in a direction opposite to the direction in which the lifting force is applied to the handgrip.

In FIG. 3, handle body 12 is pivoted so that the angled surface 50 inside the bar receiving portion 42 lies adjacent the abutment surface 30 on the bar 14 and the teeth 28a-c are disengaged and pivoted away from the teeth 28 of the bar 14 and released therefrom. The angled surface 52 at the front of the bar receiving portion 42 provides clearance between the front part of the bar receiving portion 42 and the bar 14.

In the position of FIG. 3, the handle body is in a released position with respect to the bar 14. It may be quickly and easily slid along the bar 14 to any one of a multiplicity of different positions between the ends 20, 22 in order to adjust the position of the handle along the bar and position it with respect to support means 16. When the handle body 12 is pivoted back to the position of FIG. 2, the handle body is once again automatically secured and ready to move the bar upward in a lifting direction. The handle body cannot be moved to the position of FIG. 3 until the weight is removed from support means 16. Finally, there is a cushion 56 mounted to the front surface 40 of the front bar receiving portion of the handle body 12, and extended laterally thereacross, in order to prevent marring or damage and to stabilize and position the lifting device with respect to the object to be lifted. It should be noted that the teeth 28a-c are preferably laterally coextensive with the teeth 28 so as to minimize root stresses and provide a good gripping action.

Another embodiment of the invention is shown in FIGS. 4-7 which utilizes a modified handle body 12a having the same handgrip 32 and handgrip opening 34. Side portions 36 and 38 surrounding the handgrip opening 34 extend forwardly from the handgrip 32 into an opposed pair of legs 58 and 60. Legs 58, 60 terminate in flat front surfaces 62 having cushioning bumpers 64. In this case the bar receiving opening is U-shaped opening 66 in the handle body 12a between the legs 58 and 60 which contains a pawl 68. Pawl 68 has a spring 70 which urges it into position against the means for engagement 24 extending along one side surface 26 of the bar 14. Pawl 68 is mounted on a shaft through legs 58 and 60. An operating lever 72 for pivoting the pawl away from the means for engagement 24 on the bar 14 is attached to the shaft.

Figures 4, 5, 6, 7:
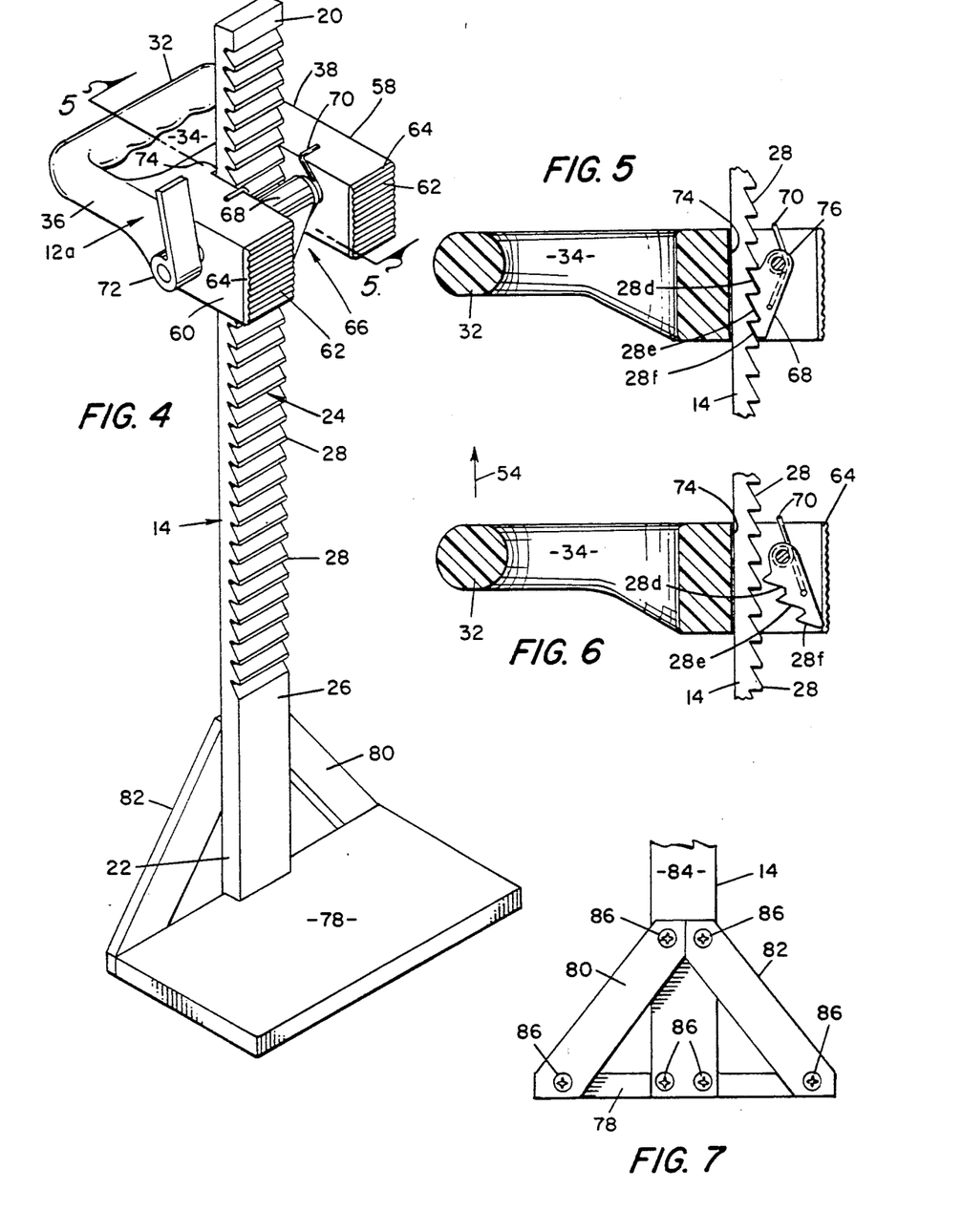
FIG. 4 is a perspective view of an alternative embodiment having a spring loaded pawl in the handle body to grip the bar.
FIG. 5 is a cutaway side elevation along line 5—5 of FIG. 4 showing the pawl in gripping portion against a portion of the bar.
FIG. 6 is a cutaway elevation showing the pawl in the release position.
FIG. 7 is a rear view of the support structure at the bottom of the FIG. 4 assembly.

FIGS. 5 and 6 show the operation of the pawl 68 in connection with the bar 14 and an abutment surface 74 which is located at the back of the handle opening. In this case, the abutment surface 74 is laterally coextensive with the width of the bar 14 in the opening 66 except for some side clearance to allow movement. In FIG. 5, the pawl is shown mounted upon shaft 76 and spring loaded in position against the means for engagement of the bar 14. Pawl 14 has teeth 28d through f which are angled upwardly and designed to interengage with any of the multiplicity of corresponding teeth 28 adjacently fixed on the surface 26 of bar 14.

In FIG. 6, the pawl is shown in the release position obtained by manually operating the operating lever 72 towards the handgrip 32. This pivots the pawl away from bar 14 and disengages the teeth 28d-f, which comprise the means for engagement on the pawl, from the corresponding teeth 28 which comprise the means for engagement on the lifting bar. In this position, the handle may be moved to any one of a multiplicity of lifting positions along the length of the elongated bar to adjust the handle body to the correct position. Upon release of the operating lever 72, the pawl reengages the teeth on the lifting bar and prevents the handle from moving in the lifting direction without lifting the bar.

The lower portion 22 of the bar 14 has affixed thereto, or supported by a right angled extension of the bar, a platform 78 which serves as a lifting surface for an object to be lifted. Support 78 may have a cushioning layer to prevent damage to the under surface of objects which will be in contact with platform 78 for lifting. Platform 78 is stabilized by angled supports 80, 82 fastened between the lifting platform 78 and the backside 84 of the lifting bar 14 as shown in FIGS. 4 and 7. Connections may be made by suitable fasteners 86. In this case the means for engagement 24 comprising the multiplicity of teeth 28 do not need to extend much further than the upper portion of the stabilizing angled supports 80, 82 because when the handle is moved down towards the support platform 28, the angled supports would interfere with further movement by contact with the lower portion of opposed arms 58, 60.

Figure 8:
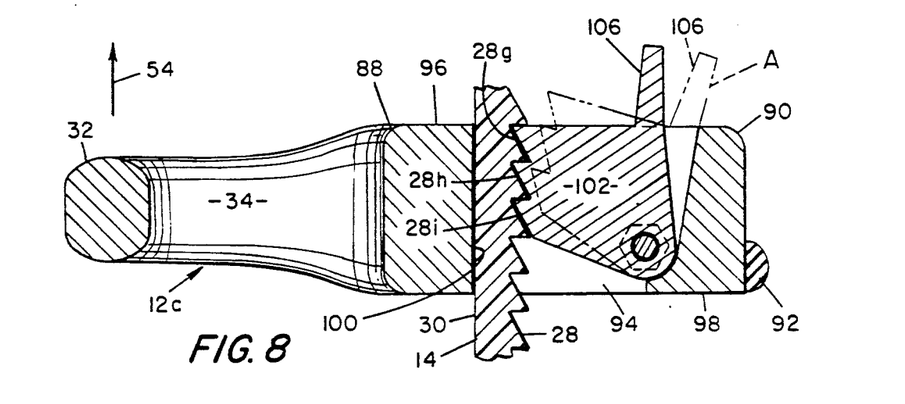
FIG. 8 is a cutaway elevation showing an alternative pawl in a gripping position, and in phantom, in a release position.
Figure 9:
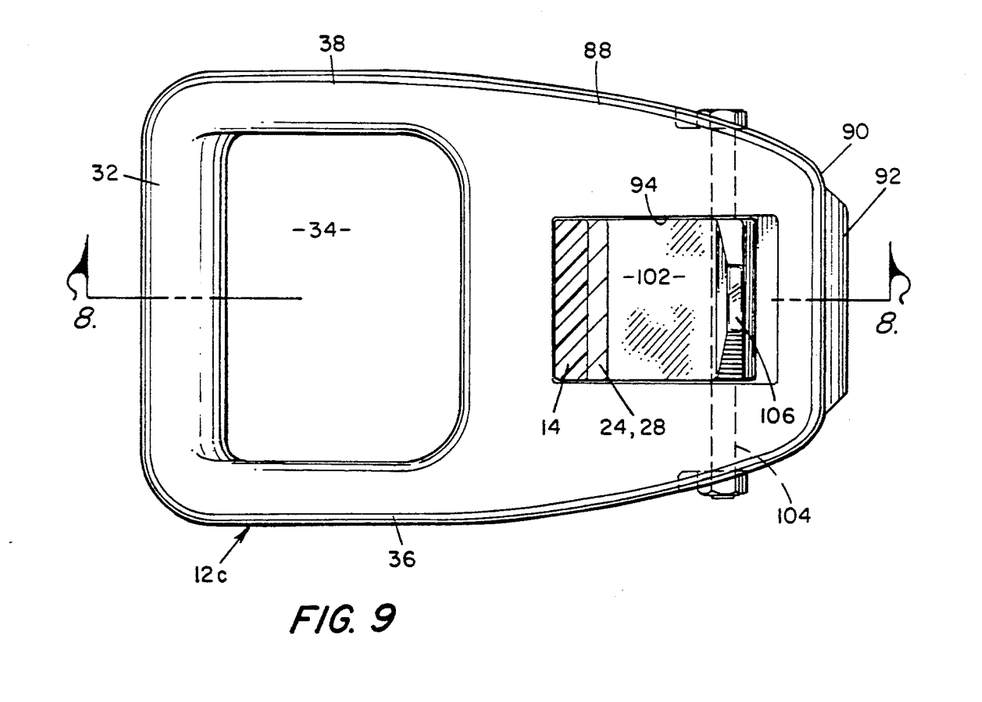
FIG. 9 is a plan view of the alternate pawl member and handle body shown in FIG. 8.

Another version of the handle body is shown in FIGS. 8 and 9. A handgrip portion 32 of handle body 12c together with side portions 36 and 38 and a front portion 88 form the hand opening 34. The front portion 88 of the handle body 12c is tapered towards a front edge 90 which has a bumper cushion 92 attached laterally along the front surface to support and stabilize the handle against the side of an object to be lifted, without damaging the object. The front portion 88 has a bar receiving portion 94 which is open between the upper surface 96 and the lower surface 98. The back of the bar receiving portion 94 is an abutment surface 100, which in the orientation shown in FIG. 8 is vertical and laterally coextensive with the received bar 14 except for some side clearance. The width of the bar receiving portion is slightly larger than the lateral width of the bar 14. The bar 14 has an abutment surface 30 which is jammed against abutment surface 100 when pawl 102 is engaged by having its means for engagement, comprising teeth 28g-i, engaged in any of the corresponding multiplicity of the corresponding teeth 28 on bar 14.

Pawl 102 is pivoted on bolt 104 which passes through and is supported by the front portion 88 of handle body 12c. Bolt 104 may be recessed in the side portions 36, 38 as indicated in FIG. 9 to provide a more attractive appearance. Pawl 102 has an upwardly extending thumb bar 106 which makes it convenient to pivot pawl 102 on bolt 104. Both the engaged and the release position are shown in FIG. 8, where the darker lines show teeth 28g-i engaged with corresponding teeth 28 of bar 14. Pawl 106 is also shown in phantom in the release position in FIG. 8 with the engagement means of the pawl disengaged from the engagement means of the bar 14. This permits handle body 12c to be moved in either direction with respect to the elongated lifting bar 14. Pawl 102 is designed with an off-center weighted condition. It automatically engages the bar 14 when pressure is removed from the thumb bar 106 because it falls by gravity into locking position. This configuration is particularly effective because the lifting force on the handgrip 32 in the lifting direction, with the engagement means of the pawl and bar engaged, results in a jamming action which in addition to the engagement of the teeth frictionally engages the bar against the abutment surface 100 and makes it stay securely in place. Because of the way the teeth are shaped, with the teeth on the bar angled downwardly and the teeth on the pawl angled upwardly, it is possible to slide the handle body 12c towards the bottom of the bar 14, opposite the lifting direction, without the necessity of operating the thumb bar 106, because the teeth will disengage automatically and rotate the pawl into a disengaged position. The off-center weight of the pawl 102 causes the teeth to be engaged by gravity which tends to always rotate the pawl into the engagement position of the teeth. In FIG. 8 the phantom position is indicated by letter A.

In the best mode, it is believed that there should be at least three teeth in the handle body which can engage a corresponding number of adjacent teeth on the elongated lifting bar. It is preferable that the teeth have almost ¼ inch depth between the peaks and valleys to provide for good engagement. The depth of the handle from top to bottom surface should be about 1 inch thick. It is expected that the handle body will be molded from commercially available structural type plastic that is not brittle but has hardness, strength and wear resistance for repeated usage. It is also contemplated that the lifting bar may be molded from structural plastic although other materials may be utilized depending upon economics and the amount of lifting capacity desired. For example, the lifting bar may be made of aluminum or steel and could be made of plastic with metal reinforcement. The handle body could also be cast in metal.

The type of pawl shown in FIGS. 8 and 9 could be biased by a spring towards the gripping position, such as a coil spring recessed into the back of the pawl between the pawl and the front edge portion 90 of the handle body. A cammed push button could also be utilized to operate the pawl instead of the operating lever 72 in the modification shown in FIG. 4.

It is expected that the portable lifting device will be useful for lifting objects around the home, and as such should be fabricated by economical processes and materials. The lifting bar need only be 18 to 24 inches long to accommodate a variety of objects to be lifted. The lifting bar is preferably about 1½ inches wide in the lateral direction. Under lifting forces, the bar is subject to bending moments which tend to create a curvature away from the vertical, depending on the stiffness of the bar. As such, it may be desirable to provide an upwardly curved lifting surface as indicated in FIG. 1 for the support 16. Alternately, the support may be angled upwardly slightly to less than a 90° angle between the lifting support platform and the longitudinal axis of the lifting bar. This is to take into account bending of the lifting bar which may occur during lifting so that there is no tendency for the object to be able to slide off the lifting surface. When the lifting surface is placed under the bottom edge of an object to be lifted, the bumper 56, 64, 92, will rest against a vertical surface of the object to be lifted and the handle is held against the object by a component of the lifting force in a horizontal direction.

The instant adjustability of the handle body with respect to the multiplicity of possible positions along the length of the lifting bar makes it possible to get just the right position of the handle with respect to the height from the floor so that the person who is lifting can lift in a comfortable lifting position using the powerful leg muscles to permit lifting without bending the arms. When lifting force is applied to the handle and the engagement means are interengaged, the bar is securely held and the handle cannot slip.

Although preferred embodiments of the invention have been described in detail, it is to be understood that various changes, substitutions and alterations can be made therein without departing from the spirit of the invention as defined by the appended claims.

What is claimed is:

1. A vertically adjustable hand held portable lifting device which is easily carried, quickly employed and instantly adjustable along the side of an object to be lifted and carried, to provide a convenient vertically adjustable handhold for lifting, comprising:

an elongate lifting bar adapted for being lifted in a vertical orientation, having an upper end and a load supporting lower end and means for engagement with an adjustable handle, said engagement means extending along a side surface of said bar substantially between said ends, and a load lifting support means located at the lower end of the lifting bar for placing under the bottom edge of an object to be lifted;

a vertically adjustable handle body for lifting said bar, the handle body having a handgrip portion and a bar receiving portion having means for engagement of the lifting bar, for lifting said bar at a multiplicity of vertical lifting position, said means for engagement of the bar receiving portion of the handle body being releasable and reengageable with the engagement means of the lifting bar for lifting at different ones of said multiplicity of lifting positions to vertically adjust the handle body to a comfortable and convenient lifting position when the load supporting lower end of the bar is placed in a lifting position next to an object to be lifted; and the handle body having a front portion extending opposite from the handgrip portion beyond the bar receiving portion to support the side of an object to be lifted when the load lifting support means is placed under the bottom edge of said object with the portable lifting device in its vertical lifting position.

2. The device of claim 1 further including a lightweight support surface for the support means.

3. The device of claim 2 wherein the support means is a right angled extension of the lower end portion of the bar.

4. The device of claim 3 wherein the extension includes a cushioning means.

5. The device of claim 1 wherein the load lifting support means is provided with stabilizing supports connected to a lower portion of the lifting bar.

6. The device of claim 1 wherein the bar receiving portion of the handle body has an abutment means which in a lifting position cooperates with the means for engagement of the handle body, to secure the lifting bar when lifting force is applied to the handgrip portion.

7. The device of claim 6 wherein the means for engagement of the handle body and the abutment means are oppositely located with respect to the bar receiving portion of the handle body.

8. The device of claim 7 wherein the means for engagement of the handle body and the abutment means are separated on opposite sides of the lifting bar when the lifting bar is positioned in the bar receiving portion of the handle body.

9. The device of claim 8 wherein the lifting bar has an abutment surface extending along a side surface of the bar opposite the means for engagement on the bar and extending between the ends of the lifting bar.

10. The device of claim 9 wherein the abutment means on the bar receiving portion of the handle body cooperates with the abutment surface of the lifting bar at any one of the multiplicity of positions in combination with the means for engagement of the handle body and the lifting bar to secure the handle body to the lifting bar when lifting force is applied to the handgrip portion.

11. The device of claim 9 wherein the bar receiving portion of the handle body has an opening in the body leveraged by the handgrip portion, having an abutment means having an angled portion, the abutment means being engageable in a lifting position with the abutment surface of the lifting bar with the respective engagement means of the handle body and lifting bar engaged, the handle body being pivotal to a release position with the angled portion of the abutment means adjacent the abutment surface of the lifting bar and the engagement means of the handle body and lifting bar being disengaged thereby.

12. The device of claim 11 wherein the bar receiving opening has a toothed portion which comprises the means for engagement of the handle body opposite said angles abutment means and the means for engagement on the lifting bar are cooperating teeth which are interengageable in the lifting position and positioned to automatically disengage when said handle body is pivoted to the release position thereby permitting movement of the handle body along the bar in either direction.

13. The device of claim 12 further including the support means being a right angle extension of the lower end portion of the bar.

14. The device of claim 12 further having a cushioning bumper means on the handle body to prevent damaging an object to be lifted.

15. The device of claim 8 wherein the means for engagement of the handle body and the abutment means are molded into the bar receiving portion of the handle body.

16. The device of claim 8 wherein the means for engagement of the handle body comprise a pivoting member having a means for engagement, attached to the bar receiving portion of the handle body and being pivotable with respect to the handle body, with the lifting bar positioned within the bar receiving portion of the handle body, between a lifting position, with the means for engagement of the pivoting member and the lifting bar interengaged, and a release position whereby the handle body can move to a different lifting position along the length of the lifting bar.

17. The device of claim 16 wherein the means for engagement of the handle body and lifting bar are cooperating teeth which can interengage to permit lifting in unison the lifting bar, by means of the handgrip portion, without movement of the handle body along the length of the lifting bar in a lifting direction.

18. The device of claim 17 wherein the handle body is adapted so that the cooperating teeth are easily disengageable and the handle body is easily movable opposite a lifting direction along a lifting bar by hand pressure on the handle body in a direction toward the lower end portion of the lifting bar.

19. A portable lifting device for use in a vertical orientation which is lightweight and instantly adjustable to any one of a multiplicity of lifting positions to provide a portable handhold for bulky objects to be lifted, comprising:

a pivotable handle body having a handgrip portion and a bar receiving portion, and means for gripping a lifting bar in one pivoted position and pivotable to another pivoted position to release a lifting bar and permit sliding the handle body along the bar to any one of a multiplicity of vertical lifting positions;

an elongated lifting bar fitable in the bar receiving portion of said handle body and having a means for gripping extending along the bar for gripping engagement at a multiplicity of positions along the bar with the means for gripping of the bar receiving portion of the handle body when the handle body is pivoted to said one pivoted position and being instantly releasable upon pivoting of the handle body to said another position, the lifting bar having a lower end for attachment of a support; and a support on the lower end of the lifting bar and useable to place under an object to be lifted with the handgrip portion of the handle body extending away from the object to be lifted, the handle body having a front portion opposite the handgrip portion which is held against the side of an object to be lifted by a horizontal component of the lifting force when the portable lifting device is oriented vertically against the side of the object with the support in contact with the bottom of the object, and lifting force is applied to the handgrip portion in order to lift the object with the lifting device.

20. The device of claim 19 wherein the support has a support surface including a cushioning means.

21. The device of claim 19 wherein the means for gripping of the handle body is formed in the handle body and is engageable and disengageable with the means for gripping of the lifting bar by pivoting the handle body.

22. The device of claim 19 wherein the means for gripping of the handle body is a pawl mounted for pivoting movement in the handle body and being pivotable to a gripping interengagement of the means for gripping of the lifting bar and pivotable to a release and disengaged position without pivoting the handle body.

23. The device of claim 22 wherein the pawl and the means for gripping of the lifting bar include interengageable teeth.

24. The device of claim 23 wherein a gripping action of the pawl on the lifting bar is accompanied by a jamming of the handle body against the lifting bar.

25. A vertically adjsutable hand-held portable lifting device which is easily carried, quickly employed and adjusted along the side of an object to be lifted and carried, to provide a convenient vertically adjustable handhold for lifting, comprising:

- an elongate lifting bar adapted for being lifted in a vertical orientation, having an upper end and a lower end and means for engagement with an adjustable handle, said engagement means extending along a side surface of said bar substantially between said ends;
- a lifting support means attached to the lower end of said lifting bar;
- a vertically adjustable handle body having a bar receiving portion which fits the lifting bar and allows the lifting bar to pass through the handle body, the bar receiving portion having a releasable and reengageable means for releasable engagement with the engagement means on the lifting bar, the handle body being quickly and easily slid along the bar to any one of a multiplicity of different positions between the ends of the bar when said engagement means is released, to vertically adjust the lifting position of the handle body to a comfortable and convenient lifting height along the side of an object to be lifted;
- the means for engagement of the handle body and lifting bar being engageable at any one of said positions along the bar to securely grip the bar for lifting;
- the handle body including a handgrip portion extending away from the bar receiving portion of the handle body to provide a handgrip for lifting; and
- the handle body further including a front portion which serves as a bumper in contact with the side of an object to be lifted when the lifting support means is placed under the bottom edge of said object with the portable lifting device oriented vertically for lifting and lifting force is applied.

* * * * *

UNITED STATES PATENT AND TRADEMARK OFFICE
CERTIFICATE OF CORRECTION

PATENT NO. : 5,127,693
DATED : July 7, 1992
INVENTOR(S) : John D. Pruit

It is certified that error appears in the above-identified patent and that said Letters Patent is hereby corrected as shown below:

In column 2, line 20, delete "is" and add --being--.

In column 3, line 4, delete "portion" and add --position--.

In column 4, line 5, delete "portion" and add --position--.

In column 9, line 40, delete "angles" and add --angled--.

In column 10, line 8, delete "a" in the phrase "along a lifting" and add --the--.

Signed and Sealed this

Thirty-first Day of August, 1993

Attest:

BRUCE LEHMAN

Attesting Officer    Commissioner of Patents and Trademarks